2,833,822
Patented May 6, 1958

2,833,822

METHOD FOR HALOGENATION AND PREPARING HALOGENATED LOWER ALKANOIC ACIDS IN A FLAME

Charles S. Cleaver, Wilmington, Del., assignor to E. I. du Pont de Nemours and Company, Wilmington, Del., a corporation of Delaware No Drawing. Application February 1, 1955
Serial No. 485,619

21 Claims. (Cl. 260—539)

This invention relates to a new method for effecting chemical reaction. More particularly, this invention relates to a new process for halogenating lower alkanoic acids.

This application is a continuation-in-part of my copending patent application, Serial No. 319,170, filed November 6, 1952, now U. S. Patent No. 2,782,219, issued February 19, 1957.

Halogen-containing organic compounds as a class are important industrial chemicals and many preparative routes thereto are known, the most common of which is direct halogenation. However, this technique, while generally proceeding satisfactorily, in many instances is not as efficient or controllable as is desired. For instance, in the fatty acid series simple halogenation yields first the alpha-monohalo derivative, then the alpha,alpha-dihalo derivative, etc. Accordingly, it is not possible by this technique to prepare the halogenated fatty acids wherein the halogen substituents are solely on carbons far from the carboxyl.

The lack of controllability of direct halogenation is particularly apparent in the preparation of halogenated derivatives of functional compounds. For instance, in preparing halogen derivatives of carboxylic acids by direct halogenation, usually either the carboxyl function is protected with a suitable ester or salt group or else the halogen substituted acyl halide is prepared directly and hydrolyzed to the desired halogenated carboxylic acid. Finally, direct halogenation is always preferably and in many instances necessarily carried out under anhydrous conditions which obviously results in higher costs and greater processing difficulties.

It is an object of this invention to provide a new process for halogenating lower alkanoic acids. A further object is to provide a simple, direct method for halogenating lower alkanoic acids while leaving the carboxyl function unchanged. A still further object is to provide a method for halogenating lower alkanoic acids which results in random halogenation of the carbon chain. Another object is to provide a new process for halogenating lower alkanoic acids in aqueous systems. Other objects will appear hereinafter.

These and other objects of this invention are accomplished by the following process for halogenating a lower alkanoic acid which comprises contacting halogen free-radicals of atomic number 17 to 53 and an aqueous dispersion of said lower alkanoic acid containing at least 5% by weight liquid water, with a combusting mixture having a normal combustion wave, maintaining the aqueous dispersion of said lower alkanoic acid in intimate mixture with said halogen radicals and said combusting mixture in a zone thereof where the temperature is at least 1500° F. measured at standard atmospheric pressure, removing the aqueous dispersion thereby obtained from contact with said combusting mixture before complete combustion of said lower alkanoic acid occurs, collecting the aqueous dispersion thus removed, and separating therefrom the resulting halogenated lower alkanoic acid. The aqueous dispersion of the lower alkanoic acid after removal from the combusting mixture is preferably recycled into intimate mixture or contact with said zone of said combusting mixture in the presence of said halogen radicals and removed therefrom as aforesaid. This recycling can be repeated a number of times to complete the conversion to the desired halogenated products.

The term "aqueous dispersion" as used herein includes both heterogeneous and homogeneous, aqueous, molecular dispersions, the latter being more commonly called aqueous solutions (see pages 145 and 423 of Washburn, "Principles of Physical Chemistry," 2nd ed., McGraw-Hill, 1921). The term "halogen radical," or sometimes "halogen free-radical," is likewise well established in the art (see page 657, Wheland, Advanced Organic Chemistry," 2nd ed., Wiley, 1949). As this reference points out, halogen radicals are frequently referred to as "atomic halogen" (see pages 1–19, 98–100, 174–180, Waters, "The Chemistry of Free Radicals," Oxford, 1948). The use of the term "atomic halogen" has probably become better established than halogen radical since the halogen free-radicals, like the other non-inert, gaseous, elements, are substantially the only known free-radicals which are single, simple, monoatomic entities. However, it is believed that it is more proper to refer to these as halogen free-radicals since their properties and reaction behavior are those of the other free-radicals, which it seems desirable, therefore, to treat as a true generic class. As is apparent from the pages referred to in Waters, and, in fact, the entirety of this book, free-radicals are well known as reactive entities functioning as reaction intermediates. In either event whether they are referred to as halogen free-radicals or atomic halogen, it is clear that what is meant is one atom of halogen with its necessary free, i. e., unpaired, unshared, and untransferred, electron.

The halogen radicals necessarily present in at least the interface between the said dispersion and the said zone are those of at least one halogen of atomic number 17–53, i. e., chlorine, bromine, and iodine, and are generated in situ in said interface by one or both of two general methods. In the first of these, ions of the said halogen, such as those from a hydrohalic acid or alkali metal salt thereof, are supplied to said interface in a separate aqueous dispersion or in the aqueous dispersion of the lower alkanoic acid reactant. Under such conditions the necessary combustion zone will normally be that established by an oxidizing or reducing combusting mixture exhibiting a normal combustion wave and containing free or combined oxygen, as supplied by an oxygen-containing fuel component, including oxygen itself.

In an alternative method, the halogen radicals are supplied through use of a halogen-containing fuel component, such as the halogens themselves in elemental form, the halogen hydrides, the halogenated hydrocarbons, or the like. In certain of these instances, particularly in the case of the elemental halogens, no oxygen-containing fuel component is necessary since the elemental halogens are known to establish the necessary normal combustion wave by direct combustion with, for instance, hydrogen. However, an oxygen-containing fuel component can also be present in addition to the halogen-containing fuel component.

From the foregoing, it is apparent that there are three possible modifications in the methods of generating the halogen radicals in at least the interface of the aqueous dispersion of the lower alkanoic acid reactant and the combustion zone: (1) halide ions are supplied to said interface in a separate aqueous dispersion or in the aqueous dispersion of the lower alkanoic acid reactant, (2) a halogen-containing fuel component is used in the absence of any oxygen-containing fuel component; and (3) a halogen-containing fuel component is used in combination with an oxygen-containing fuel component. Because of the relative lack of by-products and the ease of separation of the desired halogenated products process variation (2) is preferred. However, in terms of the amount of total products prepared, process variations (1) and (3) are preferred with (1) being particularly preferred because of its ease of operation.

It is also within the scope of this invention to combine process variation (1) with either process variations (2) or (3). Thus, the necessary halogen radicals can be generated at the interface between the combustion zone and the aqueous dispersion of the lower alkanoic acid reactant, both by supplying halide ion thereto in separate aqueous dispersion or in the aqueous dispersion of the lower alkanoic acid reactant and by use of a halogen-containing fuel component, either with or without an oxygen-containing fuel component. In many instances such a combination is preferred since it results in a relatively higher concentration of the halogen radicals in the said interface with a corresponding increase in the rate of formation of the desired halogenated products.

The zone in which the process of this invention can be carried out includes the said normal combustion wave itself and all areas adjacent thereto which are also at a temperature not less than about 1500° F. measured at standard atmospheric pressure. However, such zones arising from combustion of the above-defined fuel compositions are included within this invention whether operated at atmospheric, super-atmospheric, or sub-atmospheric pressures. In those instances where an oxygen-containing fuel component is used the preferred reaction zone is at a temperature of at least 1500° F. in a combusting mixture having a normal combustion wave which is propagated at a velocity of at least 30 cm./sec. and most preferably at a velocity of at least 90 cm./sec.

It is to be noted that when an oxygen-containing fuel component is used there are usually obtained in addition to the halogenated products higher molecular weight products of increased functional order and hydroxy-substituted derivatives and, except when the halogen is iodine, hydroperoxy-substituted derivatives as described in detail in my copending application S. N. 319,170, filed November 6, 1952, now U. S. Patent No. 2,782,219, issued February 19, 1957.

The contact time of the aqueous dispersion with the above-defined reaction zone is quite critical. It obviously must not be of such duration as to cause complete combustion of the lower alkanoic acid reactant, i. e., to raise the average temperature of the entire aqueous dispersion of the lower alkanoic acid reactant to the combustion temperature of the said reactant and, of course, the products therefrom obtained in the process. Preferably, the contact time will be of such duration that the average temperature throughout the said aqueous dispersion will not reach the boiling point of the water component under the pressure being used. In the preferred operating conditions, the reaction or contact time will range from 0.00001 to 5.0 seconds, and normally from 0.0001 to 1.0 second. The most preferred and most generally used contact times lie within the range 0.001–0.250 second.

In the foregoing description of this invention, many terms familiar to the combustion art have been used. These are adequately described in greater detail in many standard reference publications, probably the most definitive of which at present is "Combustion, Flames and Explosions of Gases," Lewis and Von Elbe, Academic Press, 1951. For instance, a definition of combustion wave will be found in said publication at page 226, wherein it is pointed out that in a combustion process the flow of heat from the ignition source initiates chemical reaction in an adjacent layer of the explosive medium so that the layer itself becomes the source of heat. In this way a zone of burning propagates through the medium. The zone constitutes a wave and is referred to as a combustion wave. In the same text at page 166, a "normal" combustion wave is specifically defined as one in which the temperature rises steeply from the initial temperature to the combustion temperature corresponding to approximately adiabatic transition to thermodynamic equilibrium. Within this wave there are no discontinuous stages of chemical transformation associated with different reaction mechanisms. This area is extremely thin and at atmospheric pressure, for instance, will normally range from 0.01 to 1.0 mm. in thickness, which is usually referred to as wave width (see "Combustion, Flames and Explosions of Gases," supra, at pp. 231–238).

The input reactants for utilization in the halogenation process of this invention are lower alkanoic acids and the like compounds having the corresponding thiolo and thiono functional groups, e. g., carbothiolic, dithiocarboxylic, e. g., dithioacetic acid, as well as the corresponding sulfonic acids. Mixtures of the above reactants can also be used.

This invention is further illustrated, but not limited, by the following examples, in which the parts are by weight except for the data given on the various fuel compositions which are in parts by volume.

*Example I*

A 2% aqueous acetic acid solution containing about 5.5% of sodium chloride was passed in the form of a cylindrical stream about 0.022 inch in diameter at a rate of about 50 parts per minute through the tip portion of the inner cone (i. e., twice through the combustion wave) of a 1/1 hydrogen/oxygen flame burning at atmospheric pressure (maximum temperature about 4150–4350° F. and normal combustion wave propagation velocity of about 600 cm./sec.), as established from a commercial hand torch with a nozzle having an orifice of 65–70 mils inside diameter. The total contact times of the aqueous solution were with (a) the total flame cross-section about 3 millisec., i. e., 0.003 sec., (b) the zone of at least 1500° F. about 4–5 millisec., i. e., 0.004–0.005 sec., and (c) the normal combustion wave about 0.01 millisec., i. e., 0.00001 sec. The input rate of each of the burner gases was maintained at about 3 liters per minute. During the passage of the solution through the flame, there was no evidence of the characteristic yellow flame color of sodium. The input temperature of the aqueous acetic acid/sodium chloride solution was about 75–80° F. and the exit temperature of the solution from the flame zone was about 95–125° F.

After passage through the flame, the aqueous reaction mixture was collected directly in a vessel cooled in an ice/water bath and the solution then recycled through the flame and normal combustion wave as previously described for a total of ten cycles. The organic products in the resultant reaction mixture were extracted with diethyl ether in a continuous counter-current liquid/liquid extractor over a period of 18 hours and the ether extract separated and dried over anhydrous magnesium sulfate. The ether was removed from the extract by distillation under atmospheric pressure and the large quantity of recovered acetic acid removed from the mobile, oily liquid residue by evaporation in a stream of nitrogen at about 50–60° C. leaving as a residue a liquid mixture of chloroacetic acid, succinic acid, hydroperoxyacetic acid, and glycolic acid. By chromatographic separation and identification techniques, in the manner of Marvel and Rand, J. Am. Chem. Soc. 72, 2642 (1950), on a chloroform solution thereof, the mixture was found to contain 76.8% chloroacetic acid, 5.4% succinic acid, 10.7% hydroperoxyacetic acid, and 7.1% of glycolic acid, all exhibiting characteristic peak elution volumes for the respective acids, identical with those exhibited by authentic samples of the various acids prepared in conventional fashion.

*Example II*

The synthesis described in Example I was repeated, substituting for the acetic acid/sodium chloride solution a 4% acetic acid solution containing about 1.9% sodium bromide. There was obtained a liquid oily mixture of carboxylic acids which by the same chromatographic separation and identification techniques was found to consist of over 95% bromoacetic acid, with minor quantities of succinic, glycolic, and hydroperoxyacetic acids, all exhibiting characteristic peak elution volumes identical with those exhibited by authentic samples of the respective acids prepared in conventional fashion.

*Example III*

The synthesis described in Example I was repeated, substituting for the acetic acid/sodium chloride solution a 4% acetic acid solution containing about 0.3% sodium iodide. There was obtained an oily, liquid carboxylic acid product which by the same chromatographic separation and identification techniques was found to consist substantially quantitatively of iodoacetic acid, exhibiting a characteristic peak elution volume identical with those exhibited by an authentic sample of the acid prepared in conventional fashion.

*Example IV*

In the manner described in Example I, a 2% aqueous acetic acid solution was passed through the tip portion of the inner cone of a 4/3 hydrogen/chlorine flame burning at atmospheric pressure for a total of ten cycles. The products were isolated and the recovered acetic acid removed as described in detail in Example I. There was thus obtained an oily, carboxylic acid product which by the same chromatographic separation and identification techniques was found to consist almost quantitatively of chloroacetic acid, exhibiting a characteristic peak elution volume therefor identical with that exhibited by an authentic sample of the acid prepared in conventional fashion.

Substantially identical results were achieved using a 4% aqueous acetic acid solution and a 1/1 hydrogen/chlorine flame.

*Example V*

In the manner described in Example I, a 4% aqueous acetic acid solution was passed through the tip portion of the inner cone of a 1/2 methyl chloride/oxygen flame burning at atmospheric pressure for a total of ten cycles. The products were isolated and the recovered acetic acid removed as described in detail in Example I. The resultant oily, carboxylic acid product was found by the same chromatographic separation and identification techniques to consist almost quantitatively of chloroacetic acid exhibiting a characteristic peak elution volume identical with that of an authentic sample of acid prepared in conventional fashion.

Substantially identical results were obtained using a 1/1 methyl chloride/oxygen flame .

*Example VI*

In the manner described in Example I a 2% aqueous acetic acid solution was passed through the tip portion of the inner cone of a 3.0/3.0/0.1 hydrogen/oxygen/hydrogen chloride flame burning at atmospheric pressure for a total of ten cycles. The resultant organic products were isolated and the recovered acetic acid separated therefrom as described in detail in Example I. The oily mixture of carboxylic acid products was found by the same chromatographic separation and identification techniques to consist of 77.0% chloroacetic acid, 0.8% succinic acid, 18.0% hydroperoxyacetic acid, and 4.2% glycolic acid, all exhibiting characteristic peak elution volumes therefor identical with those of authentic samples of the resultant acids prepared in conventional fashion.

The process of this invention requires intimate contact between an aqueous dispersion of the lower alkanoic acid reactant and the zone of a combusting mixture which is at a temperature of at least 1500° F., said mixture having a normal combustion wave. This essential process step can be achieved by moving the aqueous dispersion relative to the said zone, or vice versa, or by both of such means. The most convenient of the three means, from the standpoint of the equipment and handling thereof, involves the movement of the aqueous dispersion of the lower alkanoic acid reactant relative to the said zone. By suitable means, such as pumps, storage vessels, pressure regulators, flow controllers, and other means known in the art for measuring and handling gaseous, liquid, or solid components, the fuel compositions can be supplied to a suitable apparatus equipped with ignition means in controlled amounts so as to maintain the requisite zone having a standing combustion wave.

The aqueous dispersion of the requisite lower alkanoic acid reactant or reactants can be brought into the necessary zone, including actual contact with the said normal combustion wave, by many means. For instance, the aqueous dispersion can be in the form of a homogeneous molecular dispersion, i. e., an aqueous solution, and the said aqueous dispersion can be brought into the necessary position relative to the standing normal combustion wave in a single stream, multiple streams, flowing sheets, aerosols, sprays, or in the form of grosser droplets such as are obtained by suitably pressuring the said aqueous dispersion through a diaphragm of controlled porosity, such as the conventional sintered glass disks.

The normal combustion wave and the zone proximate thereto of the requisite temperature can likewise be in any shape or form as determined by the shape or form of the apparatus through which the fuel composition is metered prior to ignition. For instance, the combustion wave or flame which can be single or multiple, can assume the more conventional conical form, or can be in special shapes, such as those emanating from slit burners and the like. The combustion waves or flames can also be laminar or turbulent, depending on the well known Reynolds numbers for the elements of the fuel composition.

One of the alternative procedures, i. e., causing the combustion wave to move relative to the aqueous dispersion of the lower alkanoic acid reactant can be carried out using a spray or aerosol of the said aqueous dispersion and counter-currently passing in bubble-form the necessary combustion components and effecting ignition and combustion through the combustible gas bubbles resulting in explosion of the said mixture with the formation of the necessary normal combustion wave. Obviously the same effects can also be achieved by metering the necessary combustion components separately either counter or cocurrently provided that their mutual interface occurs in the ignition zone.

Although in the foregoing, specific embodiments as to the apparatus requirements and suitable means for carrying out the process of this invention have been given, it is to be understood that the present invention is by no means thus limited. Obviously, other types of apparatus and means for combining the various elements disclosed herein can be employed for effecting the process of this invention. The only requirement as to this portion of the invention is that an aqueous dispersion of the lower alkanoic acid reactant or reactants specifically involved be brought into intimate contact with the at least 1500° F. zone of a combusting fuel composition having a normal combustion wave, and wherein halogen radicals are being generated at least at the interface of said dispersion and said zone.

As indicated previously, the necessary normal combustion wave and in situ halogen radical generation in the interface between the combustion zone and the aqueous dispersion of the lower alkanoic acid reactant can be effected in several ways. In one modification of the process both are achieved by using a halogen fuel component in the presence or absence of an oxygen-containing fuel component. Suitable halogen fuel compositions include the elemental halogens themselves, i. e., chlorine, bromine, and iodine in combination with a reactive non-oxygen-containing fuel component, such as hydrogen, and the hydrohalides and organic halides such as the alkyl halides, e. g., methyl chloride, with an oxygen containing fuel component, such as oxygen or air.

Most conveniently the halogen is supplied to the interface in ionic form in solution in separate aqueous dispersion or in that of the lower alkanoic acid reactant. Suitable water-soluble sources of the ionic halogens, i. e., halides, include the halogens, the halogen hydrides, i. e., the hydrogen halides, and the water-soluble salts, especially the water soluble metal halide salts, such as those of the alkali and alkaline earth metals, e. g., hydrogen chloride, potassium bromide, lithium chloride, magnesium iodide, calcium bromide, barium chloride, and the like.

Under these conditions the normal combustion wave will generally be obtained by combusting any combustible fuel with oxygen in an amount between the lower and upper explosive limits for the particular fuel. It is within the scope of this invention to use mixtures of the fuel components. The oxygen necessary for effecting the combustion can be supplied in combined form with one or more of the fuel components or can be supplied separately or in admixture with the fuel component or components in the form of molecular oxygen. The only requisite as to the oxygen portion of the said fuel composition is that the available oxygen at the combustion site be present in amounts ranging from the lower to the upper explosive limit for the particular fuel composition, that is the fuel/oxygen composition must be combustible.

Suitable examples of the said fuel compositions, wherein the requisite oxygen is initially present in combined form, i. e., atomic form, are well known in the art. A particularly outstanding class of this type of self-contained combustible mixture will be found amongst the nitrosubstituted organic compounds, particularly those containing a relatively high proportion of nitro groups per carbon atom. Suitable specific illustrations of this type of compounds include nitromethane, trinitrotoluene, and the like.

Because of their greater availability, generally at low cost, and particularly readier handleability and greater ease of control, those fuel compositions are preferred wherein the requisite oxygen is supplied in uncombined form, i. e., as molecular oxygen, either separately or in admixture with the combustible fuel component or components being used. The necessary combustible fuel component or components which can be used are many and varied [see, for instance, Walker et al., J. Am. Chem. Soc. 74, 3769 (1952)]. For instance, all the hydrocarbons, both saturated and unsaturated, including polyunsaturated, aliphatic, aromatic, alkaromatic, araliphatic, cycloaliphatic, and like hydrocarbons can be used. The heterocyclic compounds and functionally substituted hydrocarbons and heterocyclic compounds can also be used such as alcohols, phenols, ethers, esters, ketones, and the like. Suitable specific illustrations of such compounds which can be used as fuel components include methyl alcohol, acetone, diethyl ether, ethyl acetate, methane, benzene, cyclohexane, cylohexene, butadiene, acetylene, ethane, and the like. The simpler organic and even inorganic compounds can also be used as fuel components, for instance, cyanogen, hydrogen cyanide, hydrogen, and the like.

For obvious reasons, the relatively low cost, commercially available liquid or gaseous hydrocarbons, usually mixed, constitute a preferred source of the necessary normal combustion wave. The various fuel oils themselves, whether purified or not, also constitute a preferred source of the combustion wave. Obviously, the more highly refined hydrocarbons such as gasoline or the like also constitute an excellent source of the combustion wave. The solid fuels including the various wood residues, coal and peat products, and like allied, industrially available, usually low cost materials, can also be used as fuel components.

Because of increased handling ease and the low cost availability of many such compositions, the wholly gaseous fuel components are preferred. Suitable examples of these include natural gases, including producer gas, and other types normally encountered in the natural state from petroleum operations; commercially produced combustible gases such as the so-called water, carbureted water, synthesis, blue, mixed coal, anthracite producer, coke oven, blast furnace, city gases, and the like; liquid petroleum hydrocarbons (LPH), which are commercially available under reasonably low pressures in liquid form easily expandable at atmospheric pressures to the gas phase and which usually contain various saturated and unsaturated hydrocarbons in the 2 to 4 carbon range, such as propane, butane, isobutane, ethane, propylene, and the like, normally in mixtures; as well as the previously mentioned hydrogen and carbon monoxide which, particularly the latter, appear in varying proportions in most of the above referred to commercially produced gases of the type of water gas, and the like.

The oxygen necessary with most of the above detailed fuel components for producing the necessary combustion wave for use in the present invention and which is preferably supplied in the form of molecular oxygen, i. e., uncombined, can be supplied in pure form, if desired, or equally well in the form of air, the inert diluents of which have no untoward effect on the reaction. From a cost standpoint, it is obviously preferred to supply the oxygen in the form of air. Other diluents can be present in the oxygen as well, including, for example, such materials as carbon dioxide, rare gases and the like. Other oxygen sources which support combustion can also be used, such as the oxides of nitrogen, e. g, nitrous oxide, nitrogen dioxide, and the like.

Still another modification of the process is the simultaneous use of halogen-containing and oxygen-containing fuel components either alone or in combination with any of the just described fuel components. Suitable combustible halogen-containing fuel components include elemental halogens, halogen hydrides, halohydrocarbons, especially of less than six carbons per molecule, and the like. Thus, suitable illustrative fuel compositions of this type include mixtures of hydrogen, chlorine, and oxygen; hydrogen, iodine, and carbon monoxide; hydrogen, methane, and bromine; hydrogen, oxygen, and methyl chloride; hydrogen chloride and oxygen; and the like.

It has been found essential in carrying out this process that the aqueous dispersion contain at least 5% liquid water. The upper limit of the amount of water really is infinite, since this is only controlling as to the amount of new products formed as a function of time. Reasonable requirements of time and operating costs indicate an upper practical limit of water concentration to be about 1000 parts per part of simple organic reactant or mixtures thereof, i. e., 99.9% liquid water.

The foregoing examples illustrate specifically some of the preferred embodiments of the process of this invention, e. g., using acetic acid, to produce halogenated, hydroxy and hydroperoxy substituted mono- and polycarboxylic acids. However, the invention is not to be limited thereby and there are also included within the present invention the halolalkanoic acids as obtained from the lower alkanoic acids, such as alpha-, beta- and gamma-chlorobutyric acids from butyric acid; and the like.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows.

I claim:

1. In a process for preparing polyfunctional organic compounds wherein an aqueous dispersion of a lower alkanoic acid is contacted with a fuel combusting mixture having a normal combustion wave in a zone thereof where the temperature is at least 1500° F. measured at standard atmospheric pressure, the improvement which comprises contacting and maintaining halogen free-radicals of atomic number 17 to 53 in intimate mixture with an aqueous dispersion, containing at least 5% liquid water, of said lower alkanoic acid and with said combusting mixture in a zone thereof where the temperature is at least 1500° F. measured at standard atmospheric pressure, removing the aqueous dispersion thereby obtained from contact with said combusting mixture before complete combustion of said organic compound occurs, collecting the aqueous dispersion thus removed, and separating therefrom as a resulting product the halogenated lower alkanoic acid having halogen as an additional functional group.

2. In a process for preparing polyfunctional organic compounds wherein a liquid water solution of a lower alkanoic acid is contacted with a fuel combusting mixture having a normal combustion wave in a zone thereof where the temperature is at least 1500° F. measured at standard atmospheric pressure, the improvement which comprises contacting and maintaining halogen free-radicals of atomic number 17 to 53 in intimate mixture with a liquid water solution of said lower alkanoic acid and with said combusting mixture in a zone thereof where the temperature is at least 1500° F. measured at standard atmospheric pressure, removing the liquid water solution thereby obtained from contact with said combusting mixture before the temperature of the water solution is raised to the boiling point of the water component thereof, collecting the liquid water solution thus removed, and separating therefrom as a resulting product the halogenated lower alkanoic acid having halogen as an additional functional group.

3. Process as set forth in claim 2 wherein the liquid water solution thus removed is recycled into intimate contact, in the presence of said halogen free-radicals, with said fuel combusting mixture in said zone thereof where the temperature is at least 1500° F. measured at standard atmospheric pressure.

4. In a process for preparing polyfunctional organic compounds wherein a liquid water solution of a lower alkanoic acid is contacted with a fuel combusting mixture having a normal combustion wave in a zone thereof where the temperature is at least 1500° F. measured at standard atmospheric pressure, the improvement which comprises contacting and maintaining a liquid water solution of said lower alkanoic acid which contains halide ions of a halogen of atomic number 17 to 53 in intimate mixture with an oxygen-containing fuel combusting mixture in a zone thereof where the temperature is at least 1500° F. measured at standard atmospheric pressure, removing the liquid water solution thereby obtained from contact with said oxygen-containing fuel combusting mixture before the temperature of the water solution is raised to the boiling point of the water component thereof, collecting the liquid water solution thus removed, and separating therefrom as a resulting product the halogenated lower alkanoic acid having halogen as an additional functional group.

5. Process as set forth in claim 4 wherein the liquid water solution thus removed is recycled into intimate contact, in the presence of said halide ions, with said oxygen-containing fuel combusting mixture in said zone thereof where the temperature is at least 1500° F. measured at standard atmospheric pressure.

6. In a process for preparing polyfunctional organic compounds wherein a liquid water solution of a lower alkanoic acid is contacted with a fuel combusting mixture having a normal combustion wave in a zone thereof where the temperature is at least 1500° F. measured at standard atmospheric pressure, the improvement which comprises contacting and maintaining a liquid water solution of said lower alkanoic acid, which contains an alkali metal halide of atomic number 17 to 53, in intimate mixture with an oxygen-containing fuel combusting mixture in a zone thereof where the temperature is at least 1500° F. measured at standard atmospheric pressure, removing the liquid water solution thereby obtained from contact with said oxygen-containing fuel combusting mixture before the temperature of the water solution is raised to the boiling point of the water component thereof, collecting the liquid water solution thus removed, and separating therefrom as a resulting product the halogenated lower alkanoic acid having halogen as an additional functional group.

7. Process for halogenating a lower alkanoic acid as set forth in claim 6 wherein said alkali metal halide is sodium chloride.

8. Process for halogenating a lower alkanoic acid as set forth in claim 6 wherein said alkali metal halide is sodium bromide.

9. Process for halogenating a lower alkanoic acid as set forth in claim 6 wherein said alkali metal halide is sodium iodide.

10. Process as set forth in claim 6 wherein the liquid water solution thus removed is recycled into intimate contact, in the presence of said alkali metal halide, with said oxygen-containing fuel combusting mixture in said zone thereof where the temperature is at least 1500° F. measured at standard atmospheric pressure.

11. In a process for preparing polyfunctional organic compounds wherein a liquid water solution of a lower alkanoic acid is contacted with a fuel combusting mixture having a normal combustion wave in a zone thereof where the temperature is at least 1500° F. measured at standard atmospheric pressure, the improvement which comprises contacting and maintaining a liquid water solution of said lower alkanoic acid in intimate mixture with a halogen-containing fuel combusting mixture, having a normal combustion wave and wherein the halogen is of atomic number 17 to 53, in a zone thereof where the temperature is at least 1500° F. measured at standard atmospheric pressure, removing the liquid water solution thereby obtained from contact with said halogen-containing fuel combusting mixture before the temperature of the water solution is raised to the boiling point of the water component thereof, collecting the liquid water solution thus removed, and separating therefrom as a resulting product the halogenated lower alkanoic acid having halogen as an additional functional group.

12. Process as set forth in claim 11 wherein the liquid water solution thus removed is recycled into intimate contact with said halogen-containing fuel combusting mixture in said zone thereof where the temperature is at least 1500° F. measured at standard atmospheric pressure.

13. Process for halogenating a lower alkanoic acid as set forth in claim 11 wherein said halogen-containing fuel combusting mixture is a chlorine-containing fuel combusting mixture.

14. Process for halogenating acetic acid which comprises contacting halogen free-radicals of atomic number 17 to 53 with an aqueous dispersion, containing at least 5% liquid water, of acetic acid and with a combusting mixture having a normal combustion wave, maintaining said aqueous dispersion in intimate mixture with said halogen radicals and said combusting mixture in a zone thereof where the temperature is at least 1500° F.

measured at standard atmospheric pressure, removing the aqueous dispersion thereby obtained from contact with said combusting mixture before the temperature of the aqueous dispersion is raised to the boiling point of the water component thereof, collecting the aqueous dispersion thus removed, and separating therefrom a haloacetic acid as the resulting product.

15. Process for halogenating acetic acid which comprises contacting a water solution of acetic acid and an alkali metal halide wherein the halogen is of atomic number 17 to 53 with an oxygen-containing fuel combusting mixture having a normal combustion wave, maintaining said water solution in intimate mixture with said combusting mixture in a zone thereof where the temperature is at least 1500° F. measured at standard atmospheric pressure, removing the water solution thereby obtained from contact with said combusting mixture before the temperature of the water solution is raised to the boiling point of the water component thereof, collecting the water solution thus removed, and separating therefrom a haloacetic acid as the resulting product.

16. Process for halogenating acetic acid as set forth in claim 15 wherein said alkali metal halide is sodium chloride.

17. Process for halogenating acetic acid as set forth in claim 15 wherein said alkali metal halide is sodium bromide.

18. Process for halogenating acetic acid as set forth in claim 15 wherein said alkali metal halide is sodium iodide.

19. Process for halogenating acetic acid which comprises contacting a water solution of acetic acid with a halogen-containing fuel combusting mixture having a normal combustion wave and wherein the halogen is of atomic number 17 to 53, maintaining said solution in intimate mixture with said halogen-containing fuel combusting mixture in a zone thereof where the temperature is at least 1500° F. measured at standard atmospheric pressure, removing the water solution thereby obtained from contact with said combusting mixture before the temperature of the water solution is raised to the boiling point of the water component thereof, recycling the water solution thus removed into intimate contact in said zone with said halogen-containing fuel combusting mixture and removing and collecting, as aforesaid, the water solution thereby obtained, and separating therefrom a haloacetic acid as the resulting product.

20. Process for halogenating acetic acid as set forth in claim 19 wherein said halogen-containing fuel combusting mixture is a chlorine-containing fuel combusting mixture.

21. Process for halogenating acetic acid which comprises contacting a water solution of acetic acid and a sodium halide wherein the halogen is of atomic number 17 to 53 with an oxygen-containing fuel combusting mixture having a normal combustion wave, maintaining said water solution in intimate mixture with said oxygen-containing fuel combusting mixture in a zone thereof where the temperature is at least 1500° F. measured at standard atmospheric pressure, removing the water solution thereby obtained from contact with said combusting mixture before the temperature of the water solution is raised to the boiling point of the water component thereof, recycling the water solution thus removed into intimate contact in said zone with said combusting mixture in the presence of said sodium halide and removing and collecting, as aforesaid, the water solution thereby obtained, and separating therefrom a haloacetic acid as the resulting product.

References Cited in the file of this patent

UNITED STATES PATENTS

| 2,618,654 | Ladd | Nov. 18, 1952 |
| 2,674,620 | Sonia et al. | Apr. 6, 1954 |